Sept. 11, 1934. W. W. RABEY 1,973,267
MOTOR VEHICLE PROPELLED RAILROAD CAR
Filed April 19, 1933 4 Sheets-Sheet 3
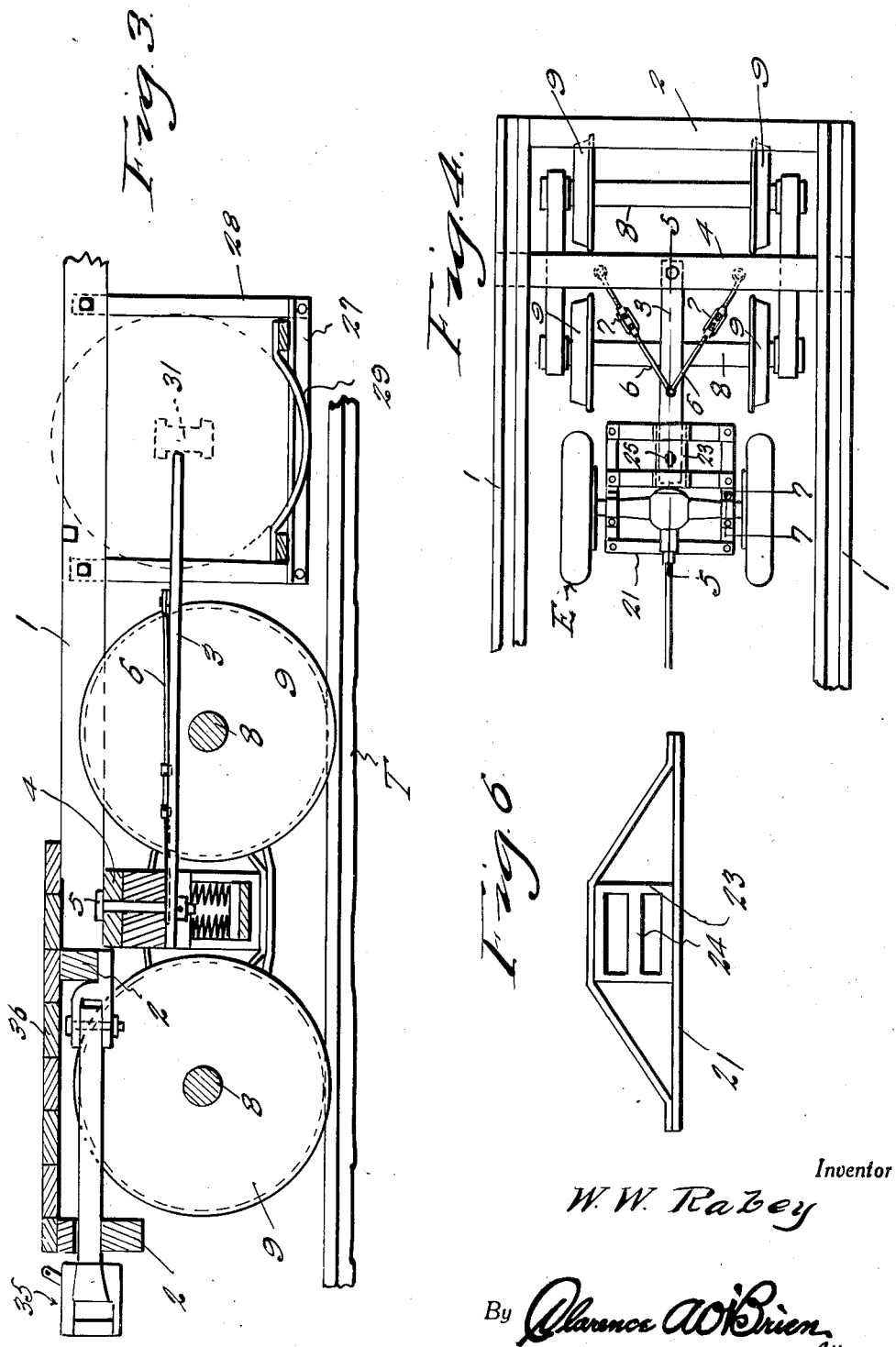
Inventor
W. W. Rabey
By Clarence A O'Brien
Attorney

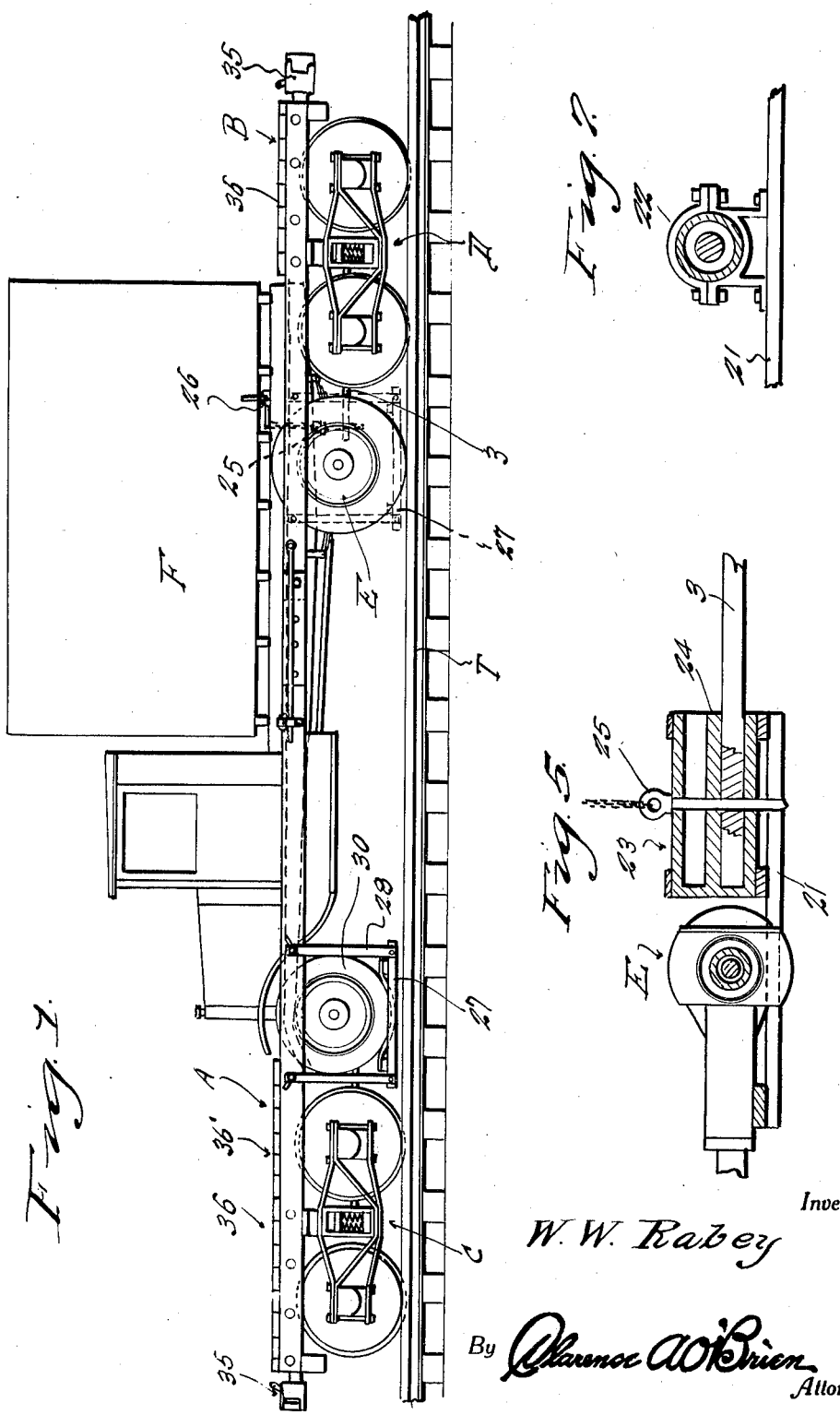

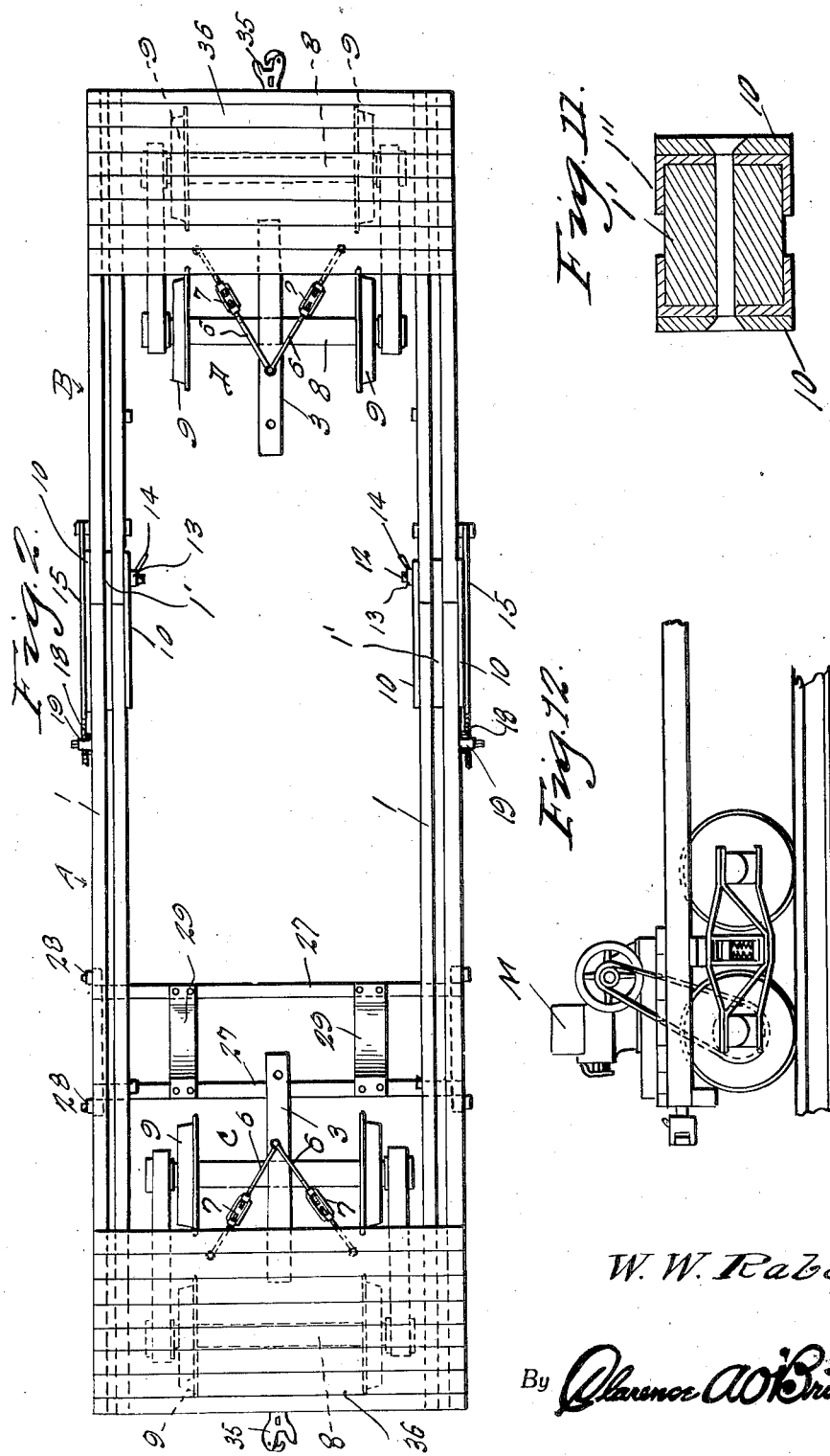

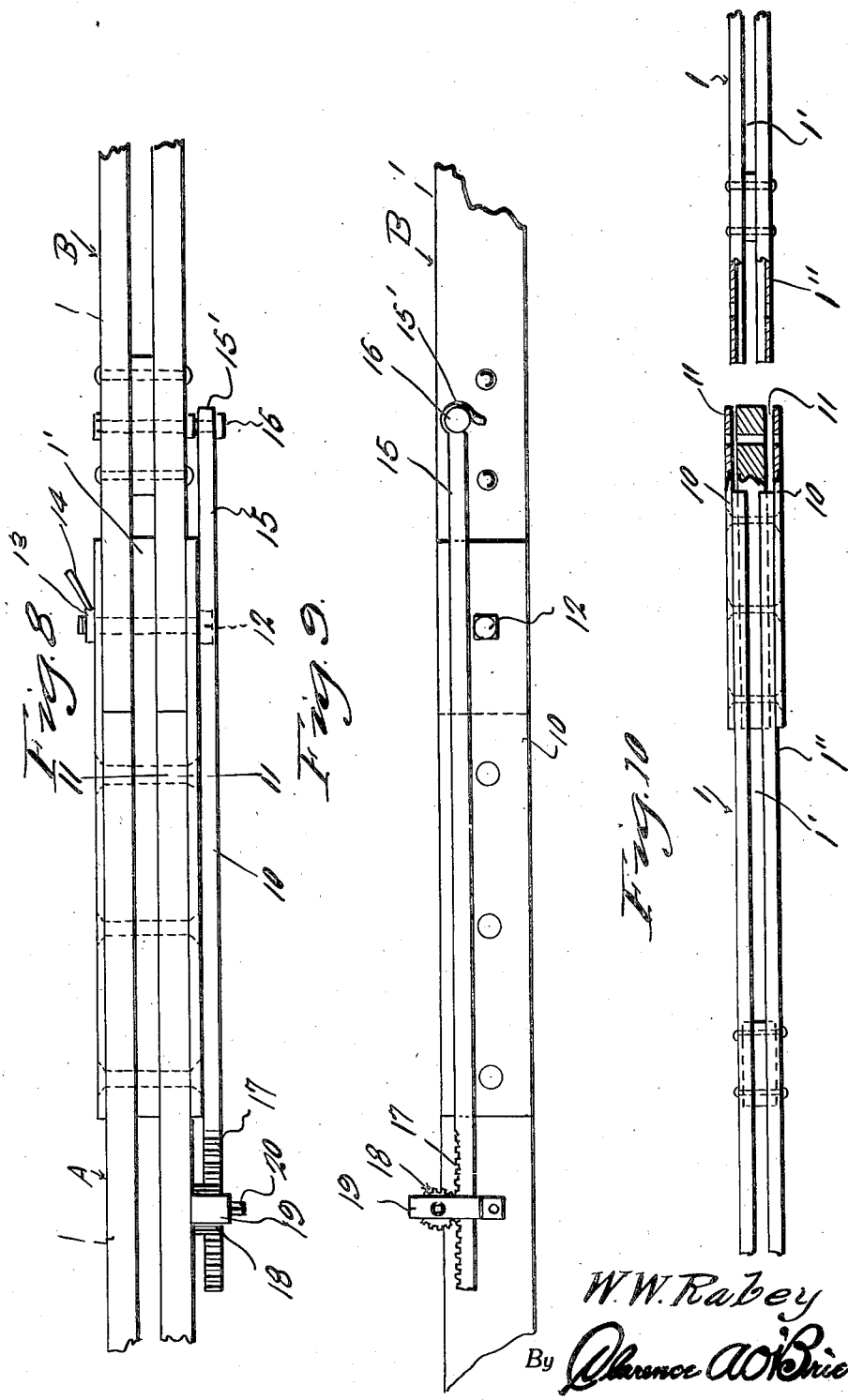

Patented Sept. 11, 1934

1,973,267

UNITED STATES PATENT OFFICE 1,973,267

MOTOR VEHICLE PROPELLED RAILROAD CAR

Warren Wallace Rabey, Long Lake, S. Dak.

Application April 19, 1933, Serial No. 666,921

9 Claims. (Cl. 105—159)

This invention relates to a railroad car, the general object of the invention being to provide means whereby a motor vehicle, without any changes thereto, can be used on a railroad track for driving one or more railroad cars, by providing a frame supported by wheels on the track and which supports said motor vehicle with its drive wheels engaging the rails of the track so that when said wheels are driven from the vehicle motor, the car or train will be moved along the track.

Another object of the invention is to provide means whereby the motor vehicle can be easily and quickly placed in the frame of the car and removed therefrom.

A further object of the invention is to provide means whereby the motor vehicle can be readily reversed in the car to drive the car, or the train, in an opposite direction.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of a car with a motor vehicle thereon, with the wheels of the car and the drive wheels of the vehicle engaging a track.

Figure 2 is a plan view of the car.

Figure 3 is a vertical longitudinal sectional view through the forward part of the car.

Figure 4 is a plan view of the rear part of the car and showing the rear wheel assembly of the truck or vehicle.

Figure 5 is a section on line 5—5 of Figure 4.

Figure 6 is a view looking toward the rear end of the small frame which is to be connected to the rear housing of the vehicle.

Figure 7 is a section on line 7—7 of Figure 4.

Figure 8 is a fragmentary top plan view showing the means for connecting the two sections of the main frame together.

Figure 9 is an elevation of Figure 8.

Figure 10 is a plan view showing the side members of the two sections of the main frame separated.

Figure 11 is a section on line 11—11 of Figure 8.

Figure 12 is a fragmentary elevation showing a motor on the car for driving a pair of wheels thereof.

In these drawings, the main frame of the device is shown as composed of two frames or sections A and B, each frame or section including the two side members 1 and the cross members 2. The frame or section A is supported on a four-wheeled truck C and the frame B by a four-wheeled truck D. These trucks are of the standard construction or of any other suitable construction and each includes a draw bar 3 connected to the bolster 4 by the pin 5 and an intermediate part of each draw bar is connected to the bolster by the diverging braces 6, each of which is adjustable as to its length through means of a turnbuckle 7. The axles of each truck are shown at 8 and the wheels at 9.

Each side member 1 of each of the frames A and B is preferably composed of a beam 1' reinforced by the channel members 1'', as shown in Figure 11, and the inner end of each side member of the frame or section A has a pair of plates 10 fastened to its sides and, as shown in Figure 10, the end of the beam and the adjacent ends of the plates extend beyond the channel members to form the spaces 11 for receiving the extended ends of the channel members of the frame or section B, when the two sections or frames are placed together, as shown in Figures 8 and 9. A bolt 12 passes through these interengaging parts to fasten each side member of the frame A to the companion side member of the frame B and the nut 13 of each bolt is provided with a handle 14.

A bar 15 has one end formed with a hook 15' to detachably engage a pin 16 at each side member 1 of the frame B. The other end of the bar is formed with the teeth 17, engaged by a toothed wheel 18 carried by a bracket 19 on each side member of the frame A so that by turning these wheels 18 by a wrench or the like engaging the noncircular projecting part 20 of the shaft of each wheel, the two sections A and B can be drawn together and then the bolts 12 put in place to fasten them firmly in position.

A small frame 21 is attached to the axle housing of the rear wheel assembly E of the motor vehicle F, such as by the clamps 22, shown in Figure 7. This frame carries a housing 23 which is divided into upper and lower chambers by a horizontal partition 24, each chamber opening out through the rear end of the housing and either chamber is adapted to receive the front end of the draw bar 3 of either of the sections A and B, according to which frame receives the rear part of the motor vehicle. By providing the two chambers, the draw bar can be placed in that chamber which is more on a level with the draw bar and this arrangement permits the invention to be used with vehicles having different diameters of wheels. A coupling pin 25 may be used for holding the draw bar in a chamber of the housing 23 and this pin can be withdrawn through means, similar to that used for uncoupling cards, such means including a manually operated shaft 26 rotatably supported in a part of the motor vehicle.

A frame 27 is suspended from the main frame by the uprights 28 and said frame 27 carries the downwardly bowed plates 29 which form seats for the front wheels 30 of the motor vehicle so as to support said wheels above the rails of the track T. This frame 27 and the parts associated therewith are bolted or otherwise detachably connected to the main frame so that it can be removed from a position on one section of the main frame to a position on the other section so that the motor vehicle can be reversed from the position it occupies in Figure 1, when it is desired to move the car in an opposite direction. When this is to be done, the pin 25, if the same is being used, is removed from the housing 23 so that the draw bar can be released from the housing and the frame 27 takes the place of the small frame 21, which is attached to the rear wheel assembly of the motor vehicle, and then the vehicle is reversed so that the car will be driven in an opposite direction.

The front draw bar 3 abuts the front axle 31 of the motor vehicle though this is not absolutely necessary as the pull of the motor vehicle on the rear truck of the railroad car through the rear draw bar 3 will impart a forward movement to the entire railway car.

From the foregoing, it will be seen that the frames A and B can be separated so that a motor vehicle can be placed between them, with the frame 21 attached to the rear axle housing of the vehicle, as shown in Figure 4, with the rear draw bar engaging one of the chambers in the housing 23. The front wheels of the vehicle are supported in raised position by the frame 27 so that these wheels will not engage the track, but the rear wheels of the vehicle will engage the track, as shown in Figure 1. The two sections A and B are, of course, connected together with the motor vehicle in this position and the rack bars 15 and the ratchet mechanism facilitate the drawing together of the two frames, as will be understood.

Then by starting up the motor of the vehicle, the drive wheels thereof engaging the rails of the track will propel the car and the vehicle along the track.

When it is desired to propel the car in an opposite direction, it is simply necessary to separate the frames and reverse the position of the vehicle and to place the frame 27 adjacent the truck of the opposite section. The frame 21 is moved with the vehicle and is attached to what now becomes the rear draw bar of the car. Then the car, with the motor vehicle, will move in an opposite direction along the track.

The car can be attached to other cars by the usual couplings 35 and platforms 36 can be mounted on the end portions of the car and a removable platform 36' can be used with the car, to fill the space between the front of the vehicle and one of the other platforms, either with the vehicle in the position shown in Figure 1 or in a reverse position.

A motor M of any suitable construction can be placed on the car and suitably connected with one of the shafts of the adjacent truck so that this motor can be used for propelling the car and also be used as an auxiliary motor for helping the motor of the vehicle to propel the train or car up grades or wherever it is necessary or desirable to provide an additional source of power to propel the car or train.

The car or train can also be equipped with the usual brake means and the compressor, controls, etc., placed in the motor vehicle.

Thus I have provided means for propelling a car or a number of cars without the use of a locomotive, as the motor vehicle takes the place of the locomotive and the body of the motor vehicle can be used for transporting material or the like, as well as the cars propelled thereby.

The motor vehicle is not changed in any manner and can be used for ordinary uses when removed from the car and a motor vehicle can be used with either pneumatic or solid rubber tires.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a motor vehicle having the usual rubber tired wheels and a railroad car including a pair of trucks, a draw bar extending forwardly from the rear truck, means for supporting the vehicle in the car with its drive wheels contacting the rails of a track, means for connecting a rear part of the vehicle with the said draw bar of the rear truck, and means for supporting the front part of the motor vehicle from the railroad car with its front wheels lifted above the rails.

2. In combination with a motor vehicle equipped with the usual rubber tired wheels and a railway car provided with the usual trucks, means for supporting the vehicle in the car with its drive wheels contacting the rails of a track and its front wheels lifted above the rails, said car being formed of two sections detachably connected together, said means permitting the vehicle to be reversed in the car to propel the car in an opposite direction.

3. In combination with a motor vehicle equipped with the usual rubber tired wheels and a railway car provided with the usual trucks, each including a draw bar, means for supporting the vehicle in the car with its drive wheels contacting the rails of a track, a frame connected to the rear part of the vehicle and provided with a chamber for receiving part of a draw bar, with a part of the front of the vehicle engaging the other draw bar.

4. In combination with a motor vehicle equipped with the usual rubber tired wheels and a railroad car provided with the usual trucks, each including a draw bar, the car being formed of two sections detachably connected together, a frame carried by a rear part of the vehicle and having a chamber for receiving a part of one draw bar, means carried by the other section for supporting the front wheels of the vehicle in raised position while the rear wheels are engaging the rails of a track.

5. In combination with a motor vehicle equipped with the usual rubber tired wheels and a railroad car provided with trucks, said car being formed of two sections detachably connected together, a frame connected with the rear wheel assembly of the vehicle, means for detachably connecting said frame to the rear truck with the drive wheels of the vehicle engaging the rails of a track, a frame detachably connected to the car for supporting the front wheels of the vehicle, means whereby said last mentioned frame can be placed adjacent either end of the car to support the front wheels of the vehicle with the vehicle facing in either one position or a reverse position, the frame carried by the rear wheel assembly of the vehicle being adapted to be connected to either truck, according to the position of the vehicle.

6. In combination with a motor vehicle equipped with the usual rubber tired wheels and a railway car provided with the usual trucks, means for supporting the vehicle in the car with its drive wheels contacting the rails of a track and its front wheels held above said rails and a motor carried by the car and connected to an axle of a truck, for helping the motor of the vehicle to propel the car when said motor of the vehicle is unable alone to propel the car.

7. The combination of a railway, a car movable thereon, and a motor vehicle supported on and detachably connected with the car and adapted to be disassociated therefrom and to be used as a separate motor vehicle unit; the drive wheels of the motor vehicle contacting the rails of the railway, whereby the motor of the vehicle is employed to drive the car, said car including a truck provided with a draw bar, and means for detachably connecting the draw bar to the rear part of the motor vehicle.

8. The combination of a railway, a car movable thereon and including a pair of trucks, a draw bar extending forwardly from the rear truck, a motor vehicle having its drive wheels contacting the rails of the railway, means for detachably connecting the rear part of the motor vehicle to the draw bar of the rear truck, and a frame depending from the body of the car in rear of the other truck, said frame having parts for supporting the front wheels of the motor vehicle above the rails.

9. The combination of a railway, a car movable thereon and including a pair of trucks, a draw bar extending forwardly from the rear truck, a motor vehicle having its drive wheels contacting the rails of the railway, means for detachably connecting the rear part of the motor vehicle to the draw bar of the rear truck, a frame depending from the body of the car in rear of the other truck, said frame having parts for supporting the front wheels of the motor vehicle above the rails, said wheel supporting parts being located slightly above the rails, and the car being formed of sections detachably connected together whereby the sections can be separated to permit the motor vehicle to be placed between the trucks.

WARREN WALLACE RABEY.